US012086886B2

(12) United States Patent
DiFranco (10) Patent No.: US 12,086,886 B2
(45) Date of Patent: Sep. 10, 2024

(54) MACHINE LEARNING FOR INSURANCE APPLICATIONS

(71) Applicant: AmTrust Financial Services, Inc., New York, NY (US)

(72) Inventor: Anthony DiFranco, Twinsburg, OH (US)

(73) Assignee: AMTRUST FINANCIAL SERVICES, INC., New York, NY (US)

( * ) Notice: Subject to any disclaimer, the term of this patent is extended or adjusted under 35 U.S.C. 154(b) by 105 days.

(21) Appl. No.: 17/533,621

(22) Filed: Nov. 23, 2021

(65) Prior Publication Data

US 2022/0164893 A1    May 26, 2022

Related U.S. Application Data

(60) Provisional application No. 63/117,747, filed on Nov. 24, 2020.

(51) Int. Cl.
| | | |
|---|---|---|
| *G06Q 40/08* | (2012.01) | |
| *G06F 40/40* | (2020.01) | |
| *G06N 20/00* | (2019.01) | |
| *G06Q 30/0204* | (2023.01) | |

(52) U.S. Cl.
CPC ............. *G06Q 40/08* (2013.01); *G06F 40/40* (2020.01); *G06N 20/00* (2019.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| 2013/0144656 | A1* | 6/2013 | Peak | G06Q 40/08 705/4 |
| 2014/0372150 | A1* | 12/2014 | Karle | G06Q 30/0631 705/4 |
| 2021/0390564 | A1* | 12/2021 | Chibanda | G06Q 10/0635 |

* cited by examiner

*Primary Examiner* — Joseph W. King
*Assistant Examiner* — Liz P Nguyen
(74) *Attorney, Agent, or Firm* — Sean F. Mellino; McDonald Hopkins LLC (57) ABSTRACT

Machine learning for insurance applications is provided to customers, potential customers, underwriters, and/or other insurance industry associates. An insurance application portal receives an insurance application from a customer regarding an insurance line of business of an insurance carrier. The portal can complete another insurance application for the customer for another line of business of the insurance carrier. The other insurance application is completed using information from the received insurance application and machine learning of customer data to infer inputs of information that does not overlap between the two applications. The portal can provide the completed second insurance application to the customer for approval to apply for the second line of business.

17 Claims, 7 Drawing Sheets

MACHINE LEARNING FOR INSURANCE APPLICATIONS

CROSS REFERENCE TO RELATED APPLICATIONS

This application claims the benefit of U.S. Provisional Patent Application Ser. No. 63/117,747, entitled "MACHINE LEARNING FOR INSURANCE APPLICATIONS" filed on Nov. 24, 2020. The entirety of the above-noted application is incorporated by reference herein.

BACKGROUND

Typically, an insurance carrier uses many data points, data fields, data attributes, and/or the like when deciding whether to insure a customer or insurance applicant. The insurance carrier usually requires every data attribute be provided by the applicant or purchased from a third party vendor. In instances where an applicant applies for multiple lines of insurance, the applicant and/or insurance carrier would repeat the data collection for each line of insurance. For example, if a customer is receiving a workers' compensation (WC) insurance quote, they must enter data into a WC rating platform in order to determine eligibility and pricing. If the same customer would also like to receive a business owner's policy (BOP) insurance quote, they enter their data into a BOP rating platform to determine eligibility and pricing. The standard approach to "pre-fill" an insurance application from vendor data fails in most cases because the data is simply not available in many cases, especially for small-sized or very new businesses. Such a process becomes time-consuming, redundant, and expensive.

This common practice within the insurance industry is due to the variety of information used to describe risk and exposure to different perils. Some data attributes are reusable between platforms (e.g. name, address, and/or the like) w % bile some data attributes are unique. In the example, workers compensation exposure is mostly determined by dollars of remuneration (e.g. payroll and/or the like), while BOP exposure varies based on industry segment and can be determined by square footage, revenue, and limits of insurance to name a few. Such a process is time-consuming, redundant, and/or expensive.

Further, a standard approach to applying ratings to an application would try to leverage standard industry segment codes like the NAICS (North American Industry Classification System) or SIC (Standard Industry Classification). The issue with this solution is that most relationships are not one-to-one and still would use manual selection of the correct code. Additionally, NAICS or SIC are often subjectively applied and, in some cases, not available.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Machine learning for insurance applications is provided to customers, potential customers, underwriters, and/or other insurance industry associates. An insurance application portal receives an insurance application from a customer regarding an insurance line of business of an insurance carrier. The portal can complete another insurance application for the customer for another line of business of the insurance carrier. The other insurance application is completed using information from the received insurance application and machine learning of customer data to infer inputs of information that does not overlap between the two applications. The portal can provide the completed second insurance application to the customer for approval to apply for the second line of business.

In aspects, the subject innovation provides substantial benefits in terms of efficiency and insurance applications. One advantage resides in a more efficient customer experience. Another advantage resides in more and increased likelihood of a cross-sell conversion.

To the accomplishment of the foregoing and related ends, certain illustrative aspects of the innovation are described herein in connection with the following description and the annexed drawings. These aspects are indicative, however, of but a few of the various ways in which the principles of the innovation can be employed, and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The subject disclosure generally pertains to insurance applications. Machine learning for insurance applications is provided to customers, potential customers, underwriters, and/or other insurance industry associates. An insurance application portal receives an insurance application from a customer regarding an insurance line of business of an insurance carrier. The portal can complete another insurance application for the customer for another line of business of the insurance carrier. The other insurance application is completed using information from the received insurance application and machine learning of customer data to infer inputs of information that does not overlap between the two applications. The portal can provide the completed second insurance application to the customer for approval to apply for the second line of business.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
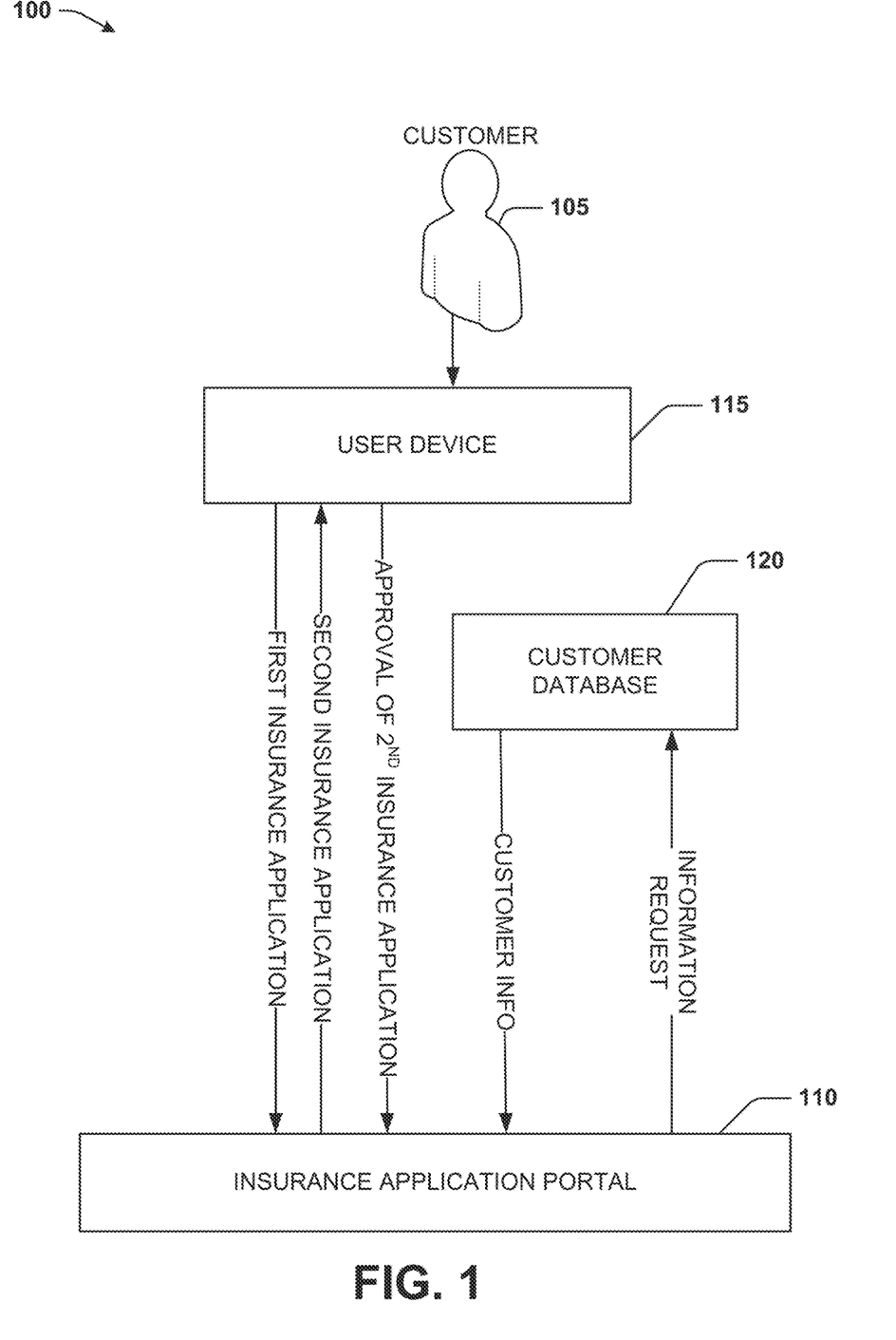
FIG. 1 illustrates a high-level diagram of the subject innovation.

FIG. 1 illustrates a system 100 for machine learning for insurance applications. A customer 105 can submit a first insurance application to an insurance application portal 110 via a user device 115. The insurance application portal 110 receives the first insurance application from the user device 115. The first insurance application can be an application regarding a first insurance line of business of an insurance carrier. The first insurance application includes a first set of customer information to be provided or otherwise completed to apply for insurance coverage in the first insurance line of business. Insurance lines of business can be home insurance, auto insurance, personal liability insurance, and/or the like. Different insurance lines of business utilize different customer information for applications to the different insurance lines of business. The insurance application portal 110 can interrogate the first insurance application for completeness. The insurance application portal 110 can accept the first insurance application upon determining the first set of customer information is complete such that the first insurance application can be evaluated, e.g., accepted or rejected. If accepted, the insurance application portal 110 can generate and send a notice to the customer 105 on the user device 115 with a first insurance policy based on the first insurance application.

The insurance application portal 110 can automatically determine a second insurance line of business to offer to the customer 105. In some embodiments, the insurance application portal 110 can determine the second insurance line of business as a complementary line of business to the first insurance line of business. In some embodiments, the insurance application portal 110 can determine the second insurance line of business via a recommendation model based on machine learning of similar customers to the customer 105. The second insurance line of business uses a second insurance application for approval. The second insurance application can use same and different customer information to be provided about the customer to complete the second insurance application for approval.

The insurance application portal 110 determines that the first set of customer information does not complete the second insurance application for the customer regarding the second insurance line of business. The insurance application portal 110 determines a second set of customer information that is used to complete the second insurance application. The insurance application portal 110 can analyze the second insurance application to determine the second set of customer information. In some embodiments, the second set of customer information can include some overlapping customer information that is included in the first set of customer information. In some embodiments, the insurance application portal 110 can complete or retrieve the second set of customer information from a customer database.

In some embodiments, the insurance application portal 110 completes the second set of customer information via a prediction model. The insurance application portal 110 determines a set of customers of the insurance carrier. The insurance application portal 110 determines the set of customers that have substantially similar customer information to the first set of customer information of the customer 105. In some embodiments, the insurance application portal 110 utilizes a matching algorithm or similarity scoring technique and threshold to determine the set of customers. The insurance application portal 110 trains the prediction model using the substantially similar customer information of the set of customers. The substantially similar customer information can include previous requests of the second line of business from the set of customers. The prediction model is trained via a machine learning technique. For example, supervised learning can be employed to produce the prediction model from a set of labeled training data associated with customer information. When invoked, the prediction model can estimate or infer missing customer information to complete the second set of customer information.

The insurance application portal 110 completes the second set of customer information that is not included in the first set of customer information such that the second set of customer information is completed for the second insurance application via the prediction model. In some embodiments, the insurance application portal 110 provides the second insurance application to the customer 105 for approval or confirmation of the customer information. The customer 105 can approve or reject the second insurance application for the second insurance line of business via the insurance application portal 110. The customer 105 can approve or deny using a user interface of the insurance application portal 110.

In some embodiments, the insurance application portal 110 estimates a rating category or classification code of the second insurance application or customer. The insurance application portal 110 utilizes natural language processing of a business description to determine a rating category or classification code.

Figure 2:
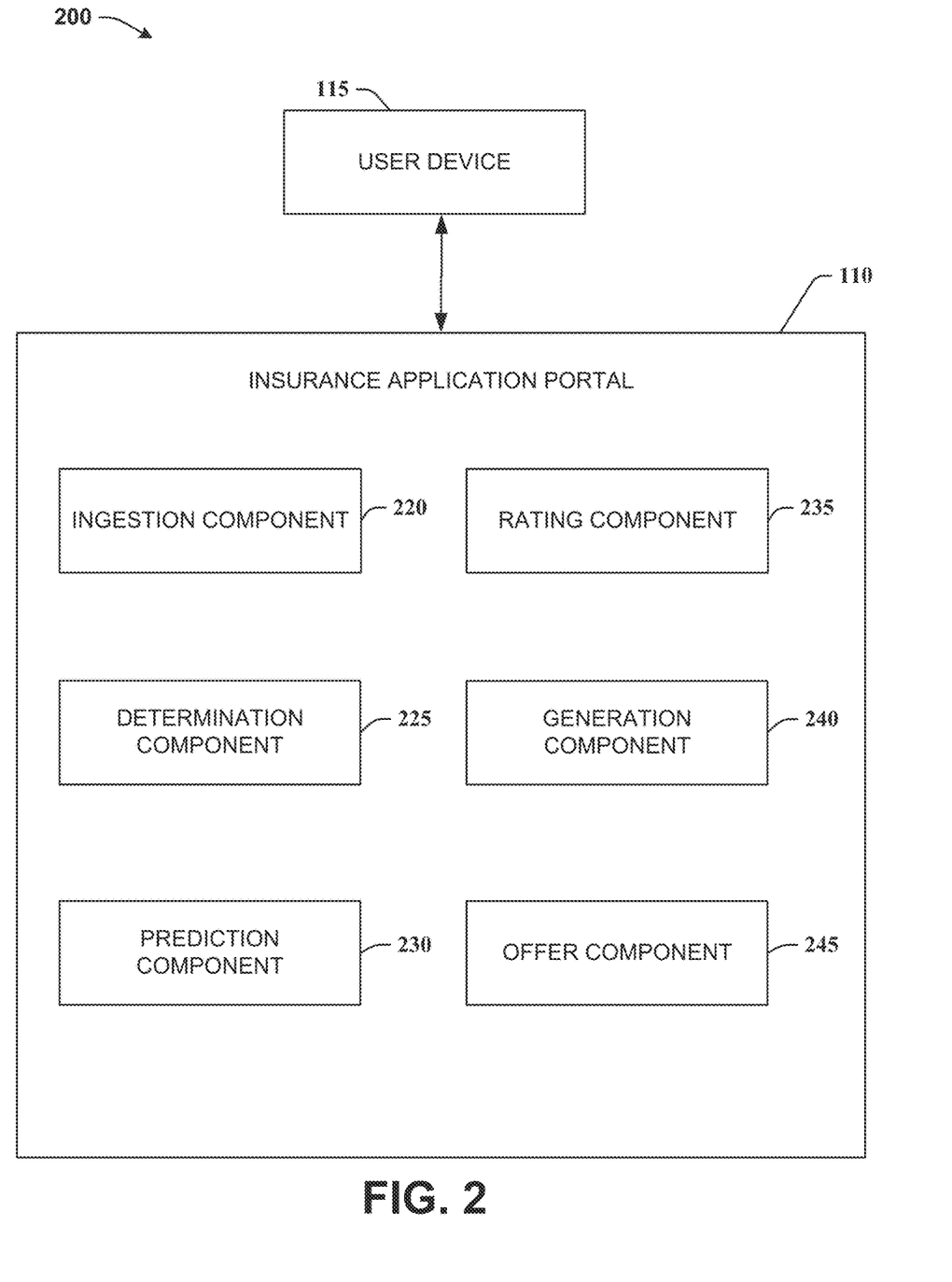
FIG. 2 illustrates a system diagram of machine learning for insurance applications.

FIG. 2 illustrates a system diagram of machine learning for insurance applications. A system 200 receives a first insurance application from a customer 105 or customer device at an insurance application portal 110. The insurance application portal 110 includes an ingestion component 220. The ingestion component 220 receives the first insurance application from the customer 105. The first insurance application is for a first insurance line of business of an insurance carrier. The first insurance application includes a first set of customer information. The first set of customer information of the first insurance application includes customer information that is specific to the first line of business.

The insurance application portal 110 includes a determination component 225. The determination component 225 determines the first set of customer information is incomplete for a second insurance application that is associated with a second insurance line of business of the same insurance carrier. The second insurance application expects a second set of customer information which may use the same information, different information, or a mix of overlapping information and differing information to complete the second insurance application. The determination component 225 determines what further information is needed for the second insurance application in view of the first insurance application and/or first set of customer information. The determination component 225 can determine what information overlaps between the first insurance application and the second insurance application using the first and second sets of customer information.

The insurance application portal 110 includes a prediction component 230. The prediction component 230 determines or predicts inputs to the missing customer information as data fields or data attributes in the second set of customer information to complete the second insurance application. The prediction component 230 fills in the missing data attributes used for each separate insurance line or data field in the application by employing machine learning techniques to intelligently infer the value expectation via a distribution of the provided data attributes. The prediction component 230 utilizes machine learning to derive the missing customer information or attributes from values of available known attributes or similar customers. In some embodiments, the prediction component 230 can use multiple imputations to derive the missing customer information.

In some embodiments, the prediction component 230 builds a model for determining inputs for missing data in the second set of customer information. The prediction component 230 uses the model to determine the inputs. The prediction component 230 trains a model using known input to data fields. For example, supervised machine learning uses a labeled dataset to train a model to estimate the label of interest. A training dataset can be built from historical data where both lines of insurance were quoted at least once for each applicant. The prediction component 230 can analyze the data to understand where correlations exist, which enables the prediction component 230 to build input features that contain relevant information about the relationship between independent and dependent variables.

The prediction component 230 can model structured data attributes (i.e. with numeric or finite enumerated values) using gradient-boosted regression trees. In some embodiments, regression trees work on the premise of maximum margin binary splitting. In other embodiments, gradient boosting is an iterative process in order to improve the performance of a statistical model by successively fitting additional independent models off the residual error remaining from the previous models.

The insurance application portal 110 includes a rating component 235. The rating component 235 estimates a rating category and/or classification code of the second insurance application and/or customer. The rating component 235 uses natural language processing to analyze a provided business description of the customer's business provided either in the first insurance application or otherwise provided to the insurance carrier and/or insurance application portal 110.

Ratings leverage independent rating bureaus and are unique to each line of business of the insurance carrier. The rating component 235 estimates a rating category, or classification code, of each customer or applicant. The rating component 235 uses a natural language approach to classify the customer or applicant and unstructured text description of the business and its typical operations. Specifically, rating component 235 trains a character-based recurrent neural network for each line of insurance that will output the most appropriate classification given the text description. In some embodiments, the rating component 235 trains a character-based recurrent neural network for each line of insurance that will output the most appropriate classification given the text description.

The insurance application portal 110 includes a generation component 240. The generation component 240 completes the second insurance application with the second set of customer information that is completed by the machine learning, or more specifically, by invoking a machine learning model that infers the second set of customer information. The generation component 240 also completes the second insurance application by using a determined rating from the rating component 235.

The insurance application portal 110 includes an offer component 245. The offer component 245 generates, sends, and/or offers the second insurance application to the customer for approval. The customer 105 can accept or deny the second insurance application for the second line of business of the insurance carrier.

Figure 3:
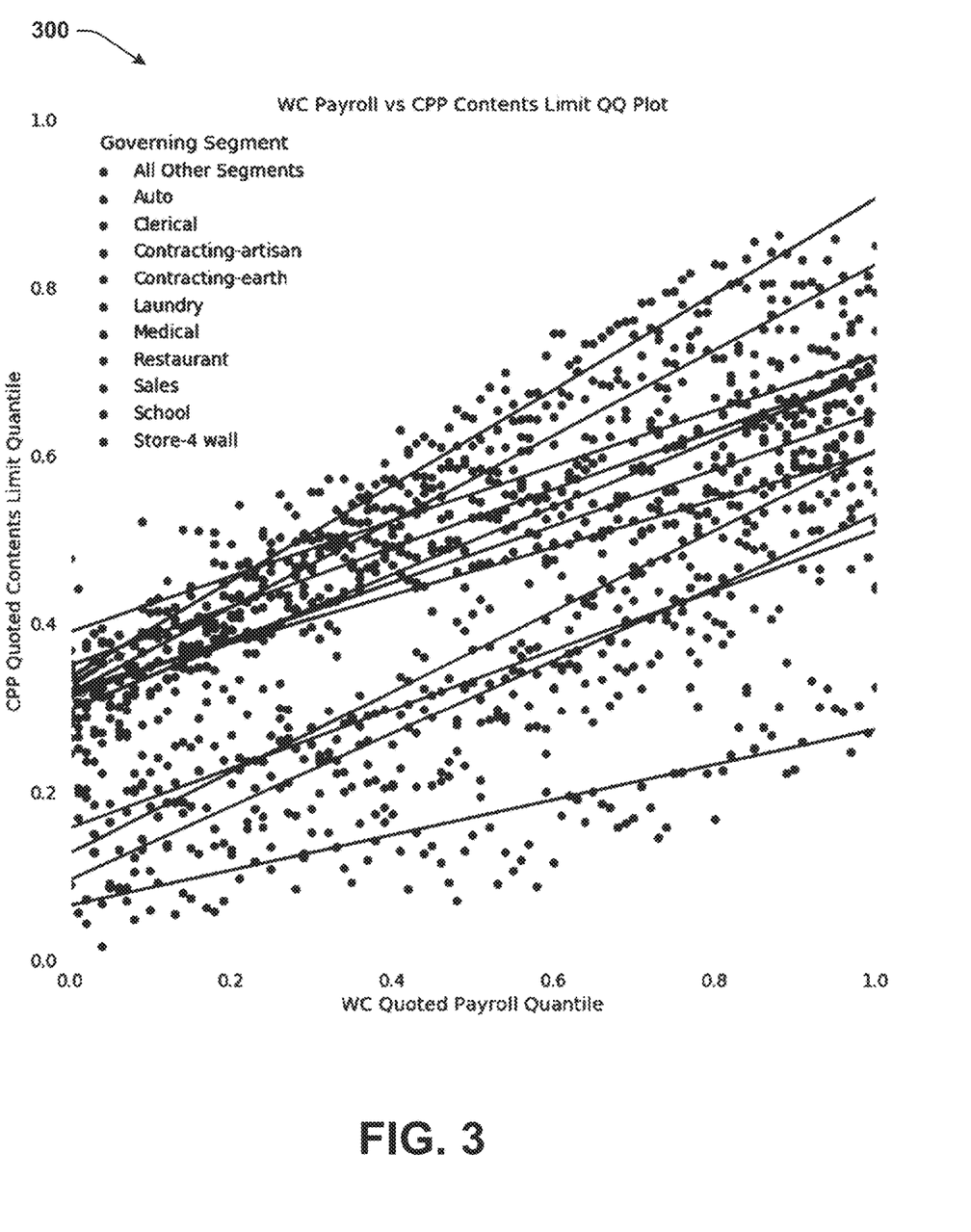
FIG. 3 illustrates an example quantile-quantile plot of machine learning for insurance applications.

FIG. 3 illustrates an example quantile-quantile plot that shows the relationship between lines of business for data estimation. The plot shows the relationship between the independent and dependent variables. In the example plot, the quoted BOP business personal property (BPP) limit and quoted WC total payroll is shown. The quantile-quantile (QQ) plot is appropriate when the scales of X and Y variables are drastically different, as in this example. When accounting for the industry segment, a rather strong linear relationship is depicted. Location-based data (e.g. zip code demographics) and specific business information (e.g. description of operations) are also used to estimate the missing data or attributes more accurately.

Figure 4:
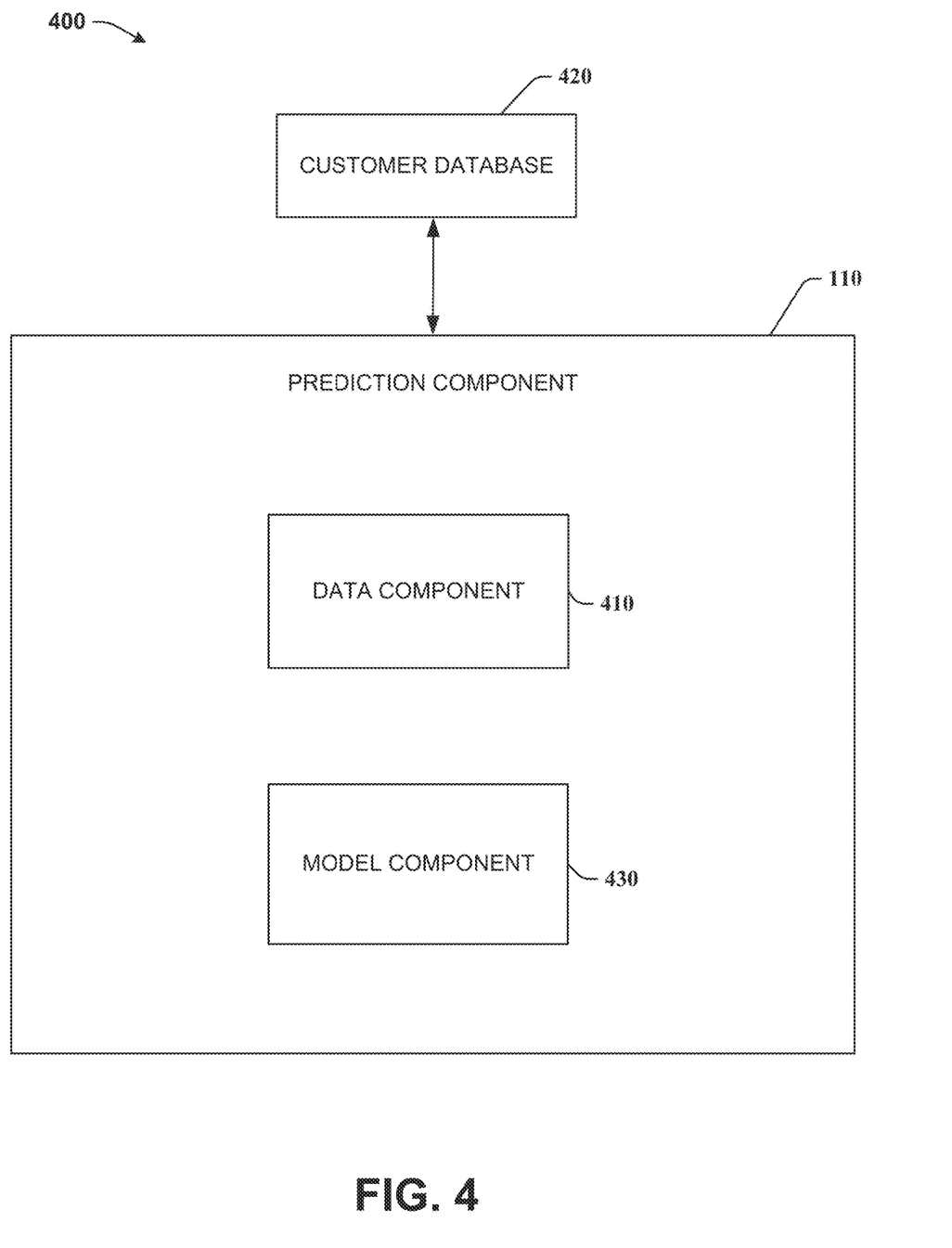
FIG. 4 illustrates a component diagram of a prediction component.

FIG. 4 illustrates a component diagram of the prediction component 230. The prediction component 230 includes a data component 410. The data component 410 retrieves data to determine or predict inputs to the missing customer information. The data component 410 accesses a customer database 420 to access customer information. For example, the customer database 420 can include customer information from customers of an insurance carrier. The data component 410 can determine a set of customers that are similar to the customer 105. For example, the set of customers can be customers of the insurance carrier that have matching demographic information, financial information, insurance lines of business, and/or the like. The data component 410 can build the set of customers using a matching algorithm, similarity algorithm, and/or the like. The data component 410 can use the customer information of the customer 105 that was provided in the first set of customer information and determine a set of customers based on similarity to the first set of customer information.

The data component 410 fills in the missing data attributes used for each separate insurance line or data field in the application. The prediction component 230 includes a model component 430. The model component 430 employs machine learning techniques to intelligently infer the value expectation via a distribution of the provided data attributes. The model component 430 utilizes machine learning to derive the missing customer information or attributes from values of available known attributes or similar customers. In some embodiments, the model component 430 can use multiple imputations to derive the missing customer information.

In some embodiments, the model component 430 builds a model for determining inputs for missing data in the second set of customer information. The data component 410 uses the model outputs to fill in the missing information in the second set of customer information. The model component 430 trains a model using known input to data fields. For example, supervised machine learning uses a labeled dataset to train a model to estimate the label of interest. A training dataset can be built from historical data where both lines of insurance were quoted at least once for each applicant. The model component 430 can analyze the data to understand where correlations exist, which enables the model component 430 to build input features which contain relevant information about the relationship between independent and dependent variables.

The model component 430 can model structured data attributes (i.e. with numeric or finite enumerated values) using gradient-boosted regression trees. Regression trees work on the premise of maximum margin binary splitting. Gradient boosting is an iterative process in order to improve the performance of a statistical model by successively fitting independent additional models off the residual error remaining from the previous models.

Figure 5:
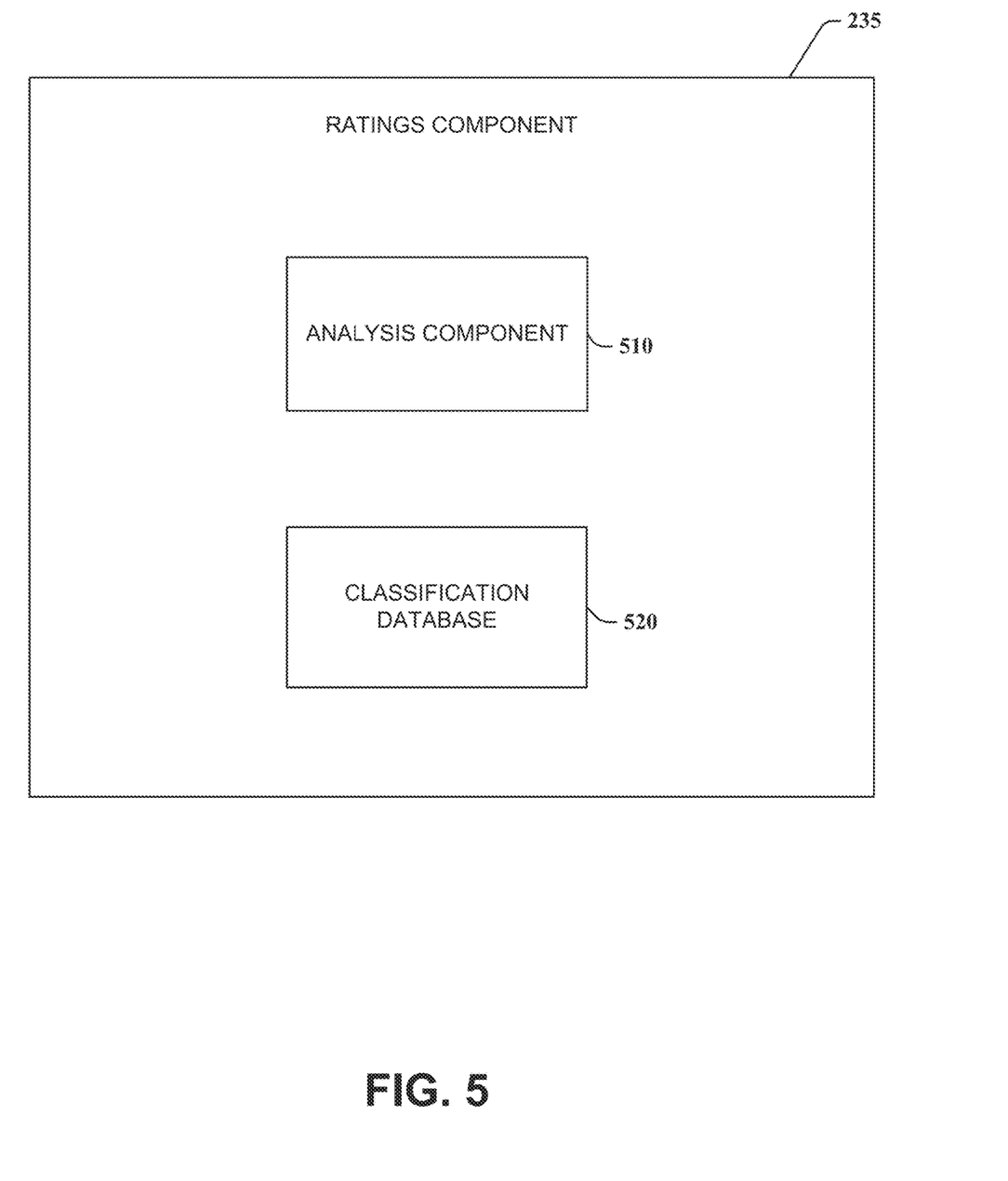
FIG. 5 illustrates a component diagram of a rating component.

FIG. 5 illustrates a component diagram of the ratings component 235. The ratings component 235 includes an analysis component 510. The analysis component 510 estimates a rating category and/or classification code of the second insurance application and/or customer. The analysis component 510 uses natural language processing to analyze a provided business description of the customer's business provided either in the first insurance application or otherwise provided to the insurance carrier and/or insurance application portal 110.

Ratings leverage independent rating bureaus and are unique to each line of business of the insurance carrier. The analysis component 510 estimates a rating category, or classification code, of each customer or applicant. The analysis component 510 uses a natural language approach to classify the customer or applicant and unstructured text description of the business and its typical operations.

The analysis component 510 can be trained using a classification database 520. The classification database 520 includes policies, classification codes, customer information, and/or other data such that the analysis component 510 can correlate the data in the classification database 520 using a neural network. Specifically, the analysis component 510 trains a character-based recurrent neural network for each line of insurance that will output the most appropriate classification given the text description. In some embodiments, the analysis component 510 trains a character-based recurrent neural network for each line of insurance that will output the most appropriate classification given the text description.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems. Bayesian belief networks, fuzzy logic, data fusion engines, classifiers . . . ). Among other things, such components can automate certain mechanisms or processes performed thereby to make portions of the systems and methods more adaptive as well as efficient and intelligent. By way of example, and not limitation, such mechanisms can be utilized by the system 100 for machine learning for insurance applications.

Figure 6:
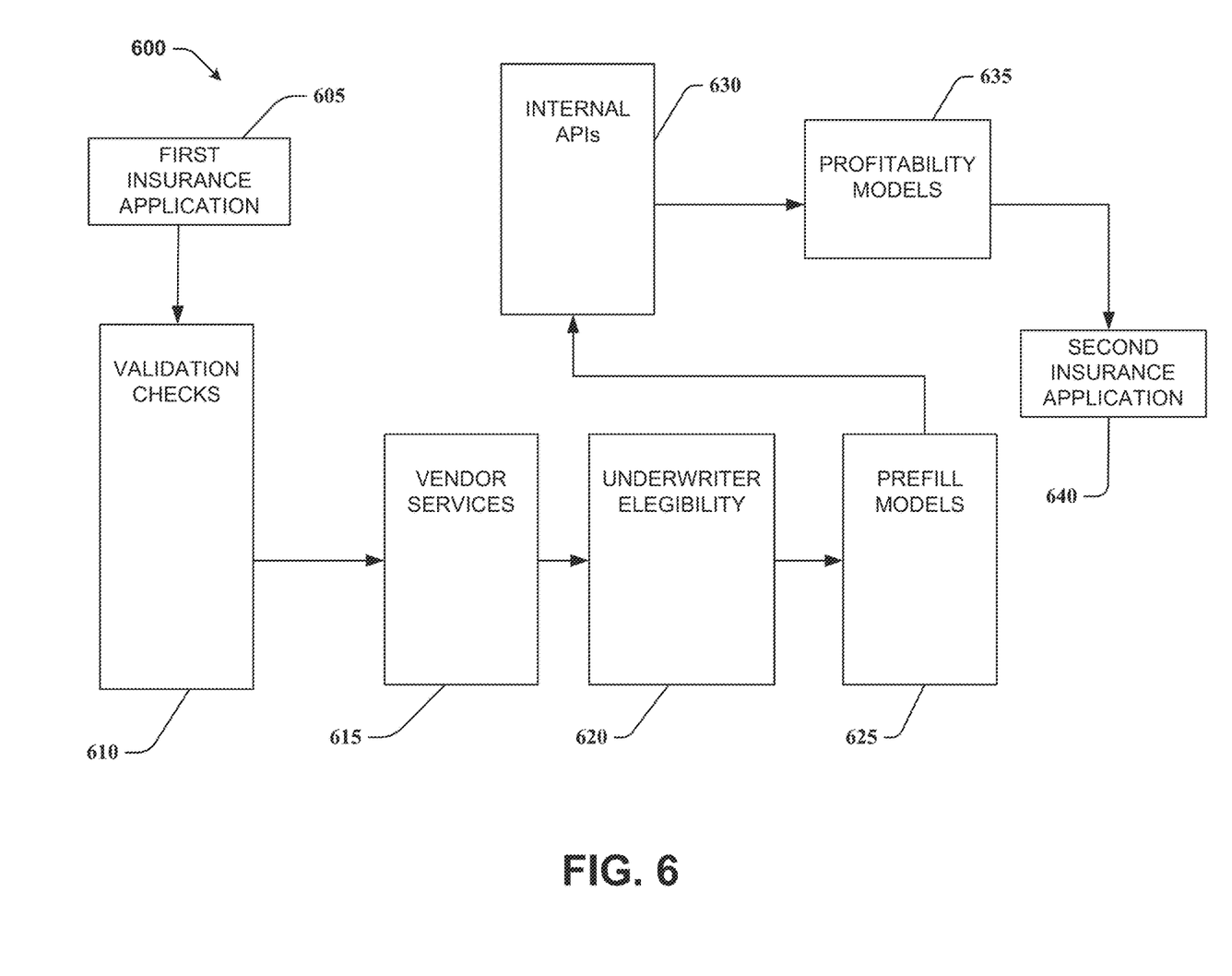
FIG. 6 illustrates a process flow of machine learning for insurance applications.

In view of the exemplary systems described above, methods that may be implemented in accordance with the disclosed subject matter will be better appreciated with reference to flow chart diagram of FIG. 6. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 6 illustrates a process flow method 600 for machine learning for insurance applications. At 605, a first insurance application is provided to the insurance application portal 110. At 610, the first insurance application is validated for the customer information provided in the first insurance application. The validation can determine missing customer information for a second insurance application. In some embodiments, the validation check includes further validation such as eligible class code, ant/quote combination, single state, single class, text-based exclusions, has BOP program, effective date, quote rating, previously converted application, and/or the like. At 615, vendor services are performed for the second insurance application. The vendor services can analyze the customer information to determine type of insurance or other insurance application terms for the second insurance application. Due to offering multiple lines of insurance simultaneously without need for human underwriter review, the insurance application portal 110 aligns with the differing appetites of each insurance line of business. In some embodiments, the vendor services include an address service, a location service, a risk meter service, a crime service, and/or the like.

At 620, the second insurance application is determined to be underwriter (UW) eligible. The insurance application portal 110 can use individually crafted regular expressions to rule out disqualifying phrases based on the business and name and description for determining eligibility. Other underwriting rules can be implemented with traditional business logic. In some embodiments, the underwriter eligibility factors in coastal distance, crime score, protection classes, wildfire risk score, and/or the like. At 625, missing information in the second insurance application is determined or completed using machine learning models for information that is not included in the first insurance application. The machine learning models infer inputs to complete information used for the second insurance application. Overlapping information between the two applications can be copied from the first insurance application to the second insurance application. In some embodiments, example data fields can include contents limit, construction, updated year, square footage, class codes, building age, stories, annual sales, and/or the like.

At 630, application programming interfaces (APIs) are used to generate a finalized second insurance application with the completed information. In some embodiments, the APIs can include quote services API, a master account API, a CPP API, an underwriting API, and/or the like. At 635, a profitability model is used as a stopgap to guard against adverse selection of an insurance application of a line of business. The profitability model can ensure the final eligibility of the second insurance application. At 640, the second insurance application is provided to the customer for review. The second insurance application can be provided through a notification, alert, API, pop up, email, text message, social media offer, and/or the like.

A method, comprising receiving a first insurance application from a customer regarding a first insurance line of business of an insurance carrier, wherein the first insurance application includes a first set of customer information; determining the first set of customer information is incomplete for a second insurance application for the customer regarding a second insurance line of business, wherein the second insurance application expects a second set of customer information, and wherein the second set of customer information expects information that is not included in the first set of customer information; and completing the second set of customer information by applying machine learning regarding the second insurance application, wherein the machine learning completes the information not included in the first set of customer information such that the second set of customer information is completed for the second insurance application.

A system comprising one or more processor having computer-executable instructions, the instruction comprising: receiving a first insurance application from a customer regarding a first insurance line of business of an insurance carrier, wherein the first insurance application includes a first set of customer information; determining the first set of customer information is incomplete for a second insurance application for the customer regarding a second insurance line of business; completing the second set of customer information via a prediction model.

A computer-readable medium having instructions to control one or more processors, the instructions comprising: receiving a first insurance application from a customer regarding a first insurance line of business of an insurance carrier, wherein the first insurance application includes a first set of customer information; determining the first set of customer information is incomplete for a second insurance application for the customer regarding a second insurance line of business, wherein the second insurance application utilizes a second set of customer information to complete a second insurance application that utilizes information that is not included in the first set of customer information; completing the second set of customer information via a prediction model.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y.'" or "'A' employs both 'X' and 'Y.'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
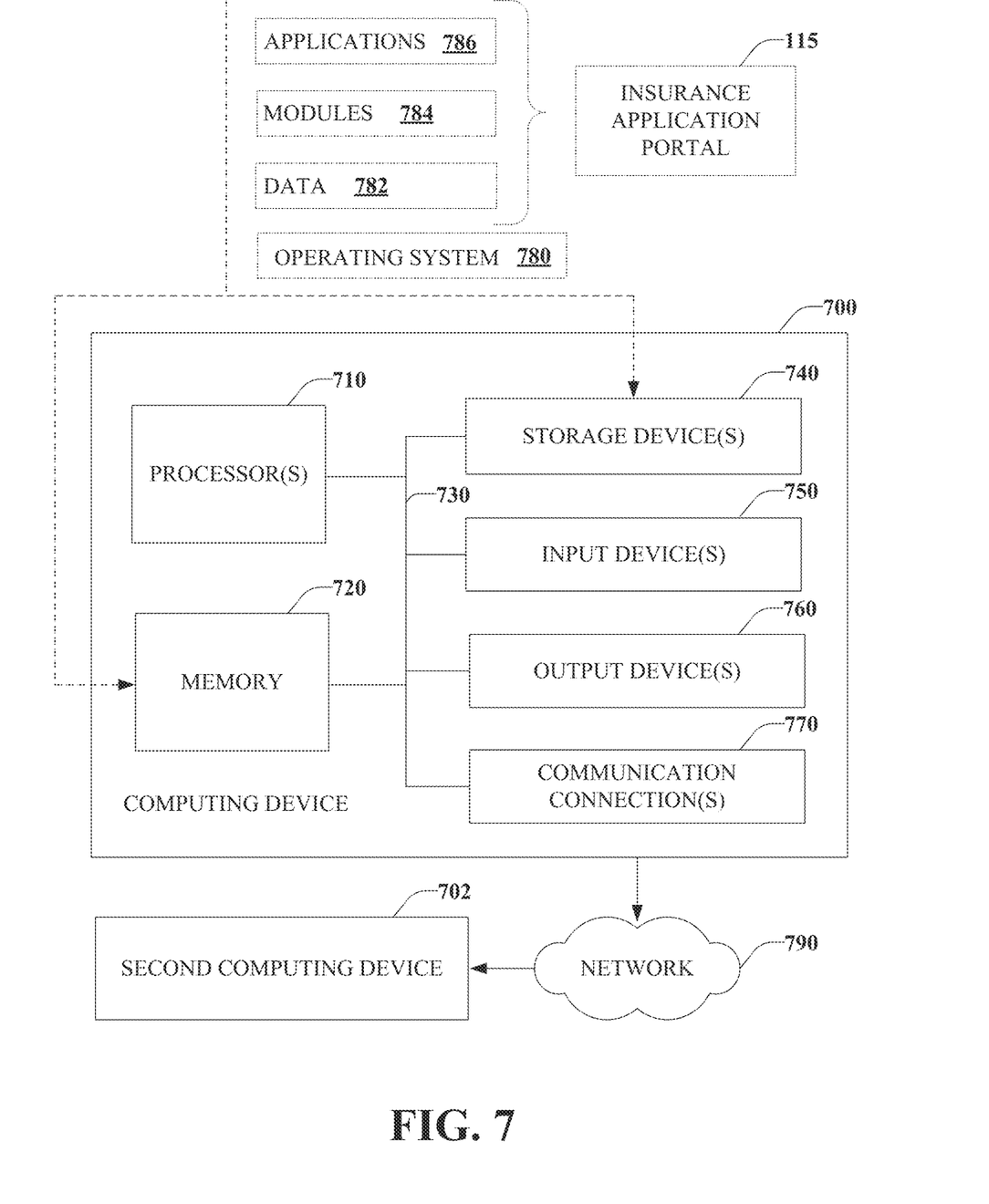
FIG. 7 illustrates a computing environment where one or more of the provisions set forth herein can be implemented, according to some embodiments.

To provide a context for the disclosed subject matter, FIG. 7 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node . . . ). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer-executable actions, instructions, and or components stored in the memory 720.

The processor(s) 710 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations with respect to digital image processing and computer graphics.

The computing device 700 can include or otherwise interact with a variety of computer-readable media to facilitate control of the computing device to implement one or more aspects of the disclosed subject matter. The computer-readable media can be any available media that is accessible to the computing device 700 and includes volatile and nonvolatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 720 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the insurance application portal 110 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the insurance application portal 110 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth . . . ), or a combination thereof.

The computing device 700 can also include communication connection(s) 770 to enable communication with at least a second computing device 702 by means of a network 790. The communication connection(s) 770 can include wired or wireless communication mechanisms to support network communication. The network 790 can correspond to a local area network (LAN) or a wide area network (WAN) such as the Internet. The second computing device 702 can be another processor-based device with which the computing device 700 can interact. For example, the computing device 700 can correspond to a server that executes functionality of the insurance application portal 110, and the second computing device 702 can be a user device that communicates and interacts with the computing device 700.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
receiving, over a computer network, data corresponding to a first insurance application by an insurance application portal of a server from a user device, wherein the data corresponding to the first insurance application includes data corresponding to a first insurance line of business of an insurance carrier, and wherein the data corresponding to the first insurance application further includes a first set of customer information;
determining, by the server, a second insurance line of business having a second insurance application in accordance with at least one of the first set of customer information or the first insurance application;
analyzing, by the server, the second insurance application to determine a second set of customer information corresponding to the second insurance application;
determining, by the server, the first set of customer information is incomplete for the second insurance application for the determined second insurance line of business;
building, by the server, a prediction model for inferring customer information, the building comprising:
determining a set of customers of the insurance carrier having substantially similar customer information to the first set of customer information via at least one of a matching algorithm or a similarity scoring and threshold technique, wherein the substantially similar customer information includes previous requests of the second line of business from the set of customers,
building a training dataset for the prediction model in accordance with the determined set of customers, and
training the prediction model using supervised machine learning in accordance with the training dataset to estimate values of a data field or a data attribute of customer information;
inferring, by the server, a value of at least one of the data field or the data attribute corresponding to missing data of the second set of customer information using the prediction model;
completing, by the server, the second set of customer information in accordance with the inferred value of the at least one of the data field or data attribute;
completing, by the server, the second insurance application in accordance with the completed second set of customer information including the inferred value of the at least one of the data field or data attribute; and
communicating, by the server, the completed second insurance application to a user interface of the user device via the computer network.

2. The method of claim 1, comprising:
wherein the second insurance application comprises a plurality of insurance lines or data fields, and wherein the server, via the prediction model, inserts data into at least one of the plurality of insurance lines or data fields using the inferred value of the second set of customer information.

3. The method of claim 2, comprising:
wherein the second set of customer information utilizes information that is not included in the first set of customer information.

4. The method of claim 1, comprising:
generating, by an application programming interface (API) a finalized second insurance application with the second set of customer information that is completed via the prediction model; and
communicating, via the computer network, the finalized second insurance application to the user device for display thereupon via at least one of an email, a pop up, a text message, a social media offer, an alert or a notification.

5. The method of claim 3, comprising:
estimating a rating category or classification code of the second insurance application or customer.

6. The method of claim 5, comprising:
wherein the estimation is via natural language processing of a business description to determine the rating category or classification code.

7. A system, comprising:
one or more processors having computer-executable instructions, the instruction comprising:
receiving, over a computer network, data corresponding to a first insurance application by an insurance application portal of a server from a user device, wherein the data corresponding to the first insurance application includes data corresponding to a first insurance line of business of an insurance carrier, and wherein the data corresponding to the first insurance application further includes a first set of customer information;
determining, by the server, a second insurance line of business having a second insurance application in accordance with at least one of the first set of customer information or the first insurance application;
analyzing, by the server, the second insurance application to determine a second set of customer information corresponding to the second insurance application;
determining, by the server, the first set of customer information is incomplete for the second set of customer information corresponding to the second insurance application for the determined second insurance line of business;
building, by the server, a prediction model for determining inputs for missing data of the second set of customer information, the building comprising:
determining a set of customers of the insurance carrier having substantially similar customer information to the first set of customer information, wherein the substantially similar customer information includes previous requests of the second line of business from the set of customers,
building a training dataset for the prediction model in accordance with the determined set of customers, and
training the prediction model using at least one of supervised machine learning or gradient-boosted regression tree learning in accordance with the training dataset to estimate values of a data field or a data attribute of customer information;

inferring, by the server, a value of at least one of a data field or a data attribute corresponding to missing data of the second set of customer information using a prediction model;

completing, by the server, the second set of customer information in accordance with the inferred value of the at least one of the data field or data attribute;

completing, by the server, the second insurance application in accordance with the completed second set of customer information including the inferred value of the at least one of the data field or data attribute; and communicating, by the server, the completed second insurance application to a user interface of the user device via the computer network.

8. The system of claim 7, the instructions further comprising:

wherein the second insurance application comprises a plurality of insurance lines or data fields, and wherein the server, via the prediction model, inserts data into at least one of the plurality of insurance lines or data fields using the inferred value of the second set of customer information.

9. The system of claim 8, the instructions further comprising:

wherein the second set of customer information utilizes information that is not included in the first set of customer information.

10. The system of claim 9, the instructions further comprising:

generating, by an application programming interface (API) of the server, a finalized second insurance application with the second set of customer information that is completed via the prediction model; and communicating, via the computer network, the finalized second insurance application to the user device for display thereupon via at least one of an email, a pop up, a text message, a social media offer, an alert or a notification.

11. The system of claim 9, the instructions further comprising:

estimating a rating category or classification code of the second insurance application or customer.

12. The system of claim 11, the instructions further comprising:

wherein the estimation is via natural language processing of a business description to determine a rating category or classification code.

13. The system of claim 7, wherein the determining the set of customers of the insurance carrier further comprises performing at least one of a matching algorithm or a similarity scoring and threshold technique to determine set of customers.

14. A non-transitory computer-readable storage medium having instructions to control one or more processors, the instructions comprising:

receiving, over a computer network, data corresponding to a first insurance application by an insurance application portal of a server from a user device, wherein the data corresponding to the first insurance application includes data corresponding to a first insurance line of business of an insurance carrier, and wherein the first insurance application includes a first set of customer information;

determining, by the server, a second insurance line of business having a second insurance application in accordance with at least one of the first set of customer information or the first insurance application;

analyzing, by the server, the second insurance application to determine a second set of customer information corresponding to the second insurance application;

determining, by the server, the first set of customer information is incomplete for the second insurance application the determined second insurance line of business, wherein the second insurance application utilizes a second set of customer information to complete a second insurance application that utilizes information that is not included in the first set of customer information;

determining a set of customers of the insurance carrier having substantially similar customer information to the first set of customer information via at least one of a matching algorithm or a similarity scoring and threshold technique, wherein the substantially similar customer information includes previous requests of the second line of business from the set of customers;

building a training dataset for the prediction model in accordance with the determined set of customers;

training a prediction model using supervised machine learning in accordance with the training dataset to infer values of a data field or a data attribute of customer information;

inferring, by the server, a value of at least one of a data field or a data attribute corresponding to missing data of the second set of customer information using the prediction model;

completing, by the server, the second set of customer information in accordance with the inferred value of the at least one of the data field or data attribute;

completing, by the server, the second insurance application in accordance with the completed second set of customer information including the inferred value of the at least one of the data field or data attribute; and communicating, by the server, the completed second insurance application to a user interface of the user device via the computer network.

15. The method of claim 1, further comprising:
training the prediction model using gradient-boosted regression tree machine learning.

16. The non-transitory computer-readable storage medium of claim 14, the instructions further comprising:
training the prediction model using gradient-boosted regression tree machine learning.

17. A method, comprising:

receiving, over a computer network, data corresponding to a first insurance application by an insurance application portal of a server from a user device, wherein the data corresponding to the first insurance application includes data corresponding to a first insurance line of business of an insurance carrier, and wherein the data corresponding to the first insurance application further includes a first set of customer information;

determining, by the server, a second insurance line of business having a second insurance application in accordance with at least one of the first set of customer information or the first insurance application;

analyzing, by the server, the second insurance application to determine a second set of customer information corresponding to the second insurance application;

determining, by the server, the first set of customer information is incomplete for the second insurance application for the determined second insurance line of business;

building, by the server, a prediction model for inferring customer information, the building comprising:
  determining a set of customers of the insurance carrier having substantially similar customer information to the first set of customer information via at least one of a matching algorithm or a similarity scoring and threshold technique, wherein the substantially similar customer information includes previous requests of the second line of business from the set of customers,
  building a training dataset for the prediction model in accordance with the determined set of customers, wherein building the training dataset further comprises:
  implementing a configuration protocol for controlling a transformation of a continuous random variable training target to a discrete random variable, and
  training the prediction model using supervised machine learning in accordance with the training dataset to estimate values of a data field or a data attribute of customer information, wherein the training further comprises:
    estimating, via natural language processing, a rating category or classification code of the second insurance application or customer from a business description, wherein the estimation includes conversion between a classification code of the first insurance line of business and a classification code of the second insurance line of business using at least one of sub word-based tokenization, vectorization, or deep learning;
applying, via the configuration protocol, at least one rule to retransform the discrete random variable to the continuous random variable subsequent to training the prediction model;

selectively adding, via the configuration protocol, at least one additional data attribute corresponding to the second set of customer information;
inferring, by the server, a value of at least one of the data field or the data attribute and the at least one additional data attribute corresponding to missing data of the second set of customer information using the prediction model;
completing, by the server, the second set of customer information in accordance with the inferred value of the at least one of the data field or data attribute and the at least one additional data attribute;
analyzing the completed second set of customer information to determine if the second set of customer information corresponds to a risk acceptable or unacceptable to the second insurance line of business;
selectively filtering out the second set of customer information responsive to a determination that the second set of customer information is an unacceptable risk associated with the second insurance line of business;
completing, by the server, the second insurance application responsive to a determination that the second set of customer information is an acceptable risk associated with the second insurance line of business in accordance with the completed second set of customer information including the inferred value of the at least one of the data field or data attribute and the at least one additional data attribute; and
communicating, by the server, the completed second insurance application to a user interface of the user device via the computer network.

* * * * *